(12) United States Patent  
Sautter et al.

(10) Patent No.: US 8,925,775 B2  
(45) Date of Patent: Jan. 6, 2015

(54) CROSSBAR T-SLOT INFILL

(71) Applicant: Yakima Innovation Development Corporation, Georgetown Grand Cayman (KY)

(72) Inventors: Chris Sautter, Portland, OR (US); Dave Condon, Wilsonville, OR (US)

(73) Assignee: Yakima Innovation Development Corporation, Georgetown, Grand Cayman (KY)

( * ) Notice: Subject to any disclaimer, the term of this patent is extended or adjusted under 35 U.S.C. 154(b) by 0 days.

(21) Appl. No.: 13/954,897

(22) Filed: Jul. 30, 2013

(65) Prior Publication Data

US 2014/0158728 A1 Jun. 12, 2014

Related U.S. Application Data

(60) Provisional application No. 61/677,427, filed on Jul. 30, 2012.

(51) Int. Cl.
   *B60R 9/04*     (2006.01)
   *B60R 9/058*    (2006.01)
   *B60R 9/052*    (2006.01)

(52) U.S. Cl.
   CPC .............. *B60R 9/058* (2013.01); *B60R 9/052* (2013.01); *B60R 9/04* (2013.01)
   USPC ........................................ 224/322

(58) Field of Classification Search
   CPC .............. B60R 9/04; B60R 9/052; B60R 9/08
   USPC ........... 224/309, 322, 325, 556; 267/160, 164
   See application file for complete search history.

(56) References Cited

U.S. PATENT DOCUMENTS

| | | | |
|---|---|---|---|
| 3,606,432 | A | 9/1971 | Honatzis |
| 3,677,451 | A | 7/1972 | Burland |
| 3,858,774 | A | 1/1975 | Friis |

(Continued)

FOREIGN PATENT DOCUMENTS

| | | |
|---|---|---|
| AU | 2003231667 A1 | 2/2004 |
| AU | 2006100386 A4 | 4/2006 |

(Continued)

OTHER PUBLICATIONS

Australian Receiving Office of WIPO, International Search Report and Written Opinion of the International Searching Authority relating to PCT Application No. PCT/NZ2008/000235, Jan. 7, 2009, 7 pages.

(Continued)

*Primary Examiner* — Justin Larson
(74) *Attorney, Agent, or Firm* — Kolisch Hartwell, P.C.

(57) ABSTRACT

An infill device may include a lower portion pressing against a floor portion of a cavity of a slotted crossbar of a vehicle rack, and an upper portion pressing upward on first and second opposing lips of a longitudinal opening to the cavity. The infill is operable between a flush position corresponding to the upper portion substantially filling the opening, and a compressed position corresponding to the upper portion moving away from the opposing lips and closer to the floor portion to allow a retention device of a cargo-specific rack accessory to enter the channel and clamp the opposing lips.

12 Claims, 4 Drawing Sheets

(56) References Cited

U.S. PATENT DOCUMENTS

| | | | |
|---|---|---|---|
| 4,245,764 A | 1/1981 | Kowalski et al. | |
| 4,264,025 A | 4/1981 | Ferguson et al. | |
| 4,274,570 A | 6/1981 | Bott | |
| 4,277,009 A | 7/1981 | Bott | |
| 4,448,337 A | 5/1984 | Cronce | |
| 4,449,656 A | 5/1984 | Wouden | |
| 4,487,348 A | 12/1984 | Mareydt | |
| 4,586,638 A | 5/1986 | Prescott et al. | |
| 4,588,117 A | 5/1986 | Bott | |
| 4,684,049 A | 8/1987 | Maby et al. | |
| 4,702,398 A * | 10/1987 | Seager | 222/386 |
| D294,340 S | 2/1988 | Robson | |
| 4,757,929 A | 7/1988 | Nelson | |
| 4,778,092 A | 10/1988 | Grace | |
| 4,789,145 A * | 12/1988 | Wenrich | 267/160 |
| 4,877,169 A | 10/1989 | Grim | |
| 4,993,615 A | 2/1991 | Arvidsson | |
| 4,995,538 A | 2/1991 | Marengo | |
| 5,025,967 A | 6/1991 | Cronce et al. | |
| 5,201,487 A | 4/1993 | Epplett | |
| 5,203,483 A | 4/1993 | Cucheran | |
| 5,205,453 A | 4/1993 | Pudney et al. | |
| 5,207,365 A | 5/1993 | Bott | |
| 5,226,634 A * | 7/1993 | Rudy et al. | 267/181 |
| 5,257,710 A | 11/1993 | Cropley | |
| 5,282,560 A | 2/1994 | Ozog | |
| 5,282,562 A | 2/1994 | Legault | |
| 5,294,033 A | 3/1994 | Duemmler | |
| 5,314,104 A | 5/1994 | Lee | |
| 5,443,190 A | 8/1995 | Cucheran et al. | |
| 5,456,512 A | 10/1995 | Gibbs et al. | |
| 5,471,714 A | 12/1995 | Olson | |
| 5,474,218 A | 12/1995 | Arsenault, Jr. et al. | |
| 5,492,258 A | 2/1996 | Brunner | |
| 5,553,761 A | 9/1996 | Audoire et al. | |
| 5,826,765 A | 10/1998 | Rak et al. | |
| 5,924,614 A | 7/1999 | Kuntze et al. | |
| 5,984,155 A | 11/1999 | Stapleton | |
| 6,010,048 A * | 1/2000 | Settelmayer | 224/321 |
| 6,062,450 A | 5/2000 | Noel et al. | |
| 6,102,265 A | 8/2000 | Stapleton | |
| 6,105,841 A | 8/2000 | Aftanas | |
| 6,176,404 B1 * | 1/2001 | Fourel | 224/309 |
| 6,182,876 B1 | 2/2001 | Moliner | |
| 6,273,311 B1 | 8/2001 | Pedrini | |
| 6,276,747 B1 * | 8/2001 | Ogawa et al. | 296/180.1 |
| 6,279,802 B1 | 8/2001 | Hickman et al. | |
| 6,557,931 B1 * | 5/2003 | Tremmel et al. | 296/213 |
| 6,662,982 B1 | 12/2003 | Päkkilä | |
| 6,722,541 B1 | 4/2004 | Aftanas et al. | |
| 6,779,696 B2 | 8/2004 | Aftanas et al. | |
| 6,796,471 B2 | 9/2004 | Aftanas et al. | |
| 6,817,500 B2 | 11/2004 | Neaux | |
| 6,845,893 B2 | 1/2005 | Nelson | |
| 6,845,922 B2 * | 1/2005 | Stark | 239/302 |
| 6,905,053 B2 | 6/2005 | Allen | |
| 6,997,657 B1 | 2/2006 | Saward | |
| 7,182,233 B1 | 2/2007 | Graffy et al. | |
| 7,201,436 B2 * | 4/2007 | Ludwig et al. | 296/210 |
| 7,328,824 B2 | 2/2008 | Smith et al. | |
| 7,641,249 B2 * | 1/2010 | Jung | 296/1.08 |
| 7,721,925 B1 | 5/2010 | Graffy et al. | |
| 7,757,914 B2 | 7/2010 | Book et al. | |
| 8,087,557 B2 | 1/2012 | Larsson et al. | |
| 8,104,651 B2 | 1/2012 | Bingham | |
| 8,333,311 B2 | 12/2012 | Hubbard | |
| 8,393,508 B2 * | 3/2013 | Sautter et al. | 224/325 |
| 8,544,707 B2 * | 10/2013 | Hubbard | 224/316 |
| 2001/0013528 A1 | 8/2001 | Chimenti et al. | |
| 2003/0178457 A1 | 9/2003 | Wang | |
| 2004/0118886 A1 | 6/2004 | Mirshafiee et al. | |
| 2004/0211801 A1 | 10/2004 | Barbara | |
| 2005/0029320 A1 | 2/2005 | Chimenti et al. | |
| 2005/0051585 A1 | 3/2005 | Kamiya et al. | |
| 2006/0049324 A1 | 3/2006 | Smith et al. | |
| 2006/0208022 A1 | 9/2006 | Karlsson | |
| 2006/0273123 A1 | 12/2006 | Settelmayer | |
| 2007/0036628 A1 | 2/2007 | Womack et al. | |
| 2007/0108243 A1 | 5/2007 | Bingham | |
| 2008/0257924 A1 * | 10/2008 | Kmita et al. | 224/309 |
| 2009/0159624 A1 * | 6/2009 | Johnson et al. | 224/316 |
| 2010/0078454 A1 | 4/2010 | Sautter et al. | |
| 2010/0237116 A1 | 9/2010 | Hubbard | |
| 2010/0282799 A1 | 11/2010 | Hubbard | |
| 2010/0308091 A1 * | 12/2010 | Hubbard | 224/316 |
| 2011/0174853 A1 | 7/2011 | Hubbard | |
| 2013/0062379 A1 | 3/2013 | Sautter et al. | |
| 2013/0200121 A1 | 8/2013 | Hubbard | |
| 2013/0284779 A1 * | 10/2013 | Sautter et al. | 224/323 |
| 2014/0028007 A1 * | 1/2014 | Pfeiffer et al. | 280/769 |

FOREIGN PATENT DOCUMENTS

| | | | |
|---|---|---|---|
| CN | 101559737 A | 10/2009 | |
| CN | 101559738 A | 10/2009 | |
| CN | 101868375 A | 10/2010 | |
| CN | 101868376 A | 10/2010 | |
| CN | 102177047 A | 9/2011 | |
| CN | 101861257 B | 11/2012 | |
| DE | 3209912 A1 | 10/1983 | |
| DE | 3637856 A1 * | 5/1988 | |
| DE | 202005007566 U1 | 7/2005 | |
| EP | 0151907 A2 | 8/1985 | |
| EP | 0193501 A2 | 9/1986 | |
| EP | 0646074 B1 | 10/1996 | |
| EP | 0398885 B2 | 6/1997 | |
| EP | 0945307 A2 | 9/1999 | |
| EP | 1205358 A1 | 5/2002 | |
| EP | 1340652 A1 | 9/2003 | |
| EP | 1712420 A1 | 10/2006 | |
| EP | 2200869 B1 | 4/2014 | |
| FR | 2632595 A1 | 12/1989 | |
| GB | 1045619 A | 10/1966 | |
| GB | 1311367 A | 3/1973 | |
| GB | 2277309 A | 10/1994 | |
| GB | 2303344 A | 2/1997 | |
| JP | 10250488 A | 9/1998 | |
| WO | 9110581 A1 | 7/1991 | |
| WO | WO 9954168 A1 * | 10/1999 | |
| WO | 2009038479 A1 | 3/2009 | |
| WO | 2009038480 A1 | 3/2009 | |
| WO | 2009041828 A1 | 4/2009 | |
| WO | 2010030198 A1 | 3/2010 | |
| WO | 2011084075 A1 | 7/2011 | |
| WO | 2014022435 A1 | 2/2014 | |

OTHER PUBLICATIONS

The Internatioanl Bureau of WIPO, International Preliminary Report on Patentability regarding PCT Patent Application No. PCT/NZ2008/000235, Jul. 28, 2009, 7 pages.

European Patent Office, Extended European Search Report regarding European Patent Application No. 08831383.8, Oct. 19, 2011, 4 pages.

U.S. Patent and Trademark Office, Office Action regarding U.S. Appl. No. 12/679,431, Jul. 5, 2012, 9 pages.

U.S. Patent and Trademark Office, Office Action regarding U.S. Appl. No. 12/679,431, Mar. 28, 2013, 10 pages.

The International Bureau of WIPO, International Search Report and Written Opinion of the International Searching Authority relating to PCT Application No. PCT/US13/52785, Jan. 7, 2014, 15 pages.

U.S. Patent and Trademark Office, Office Action regarding U.S. Appl. No. 14/042,560, Apr. 10, 2014, 14 pages.

* cited by examiner

CROSSBAR T-SLOT INFILL

CROSS-REFERENCE TO RELATED APPLICATIONS

This application claims priority under 35 U.S.C. §119(e) to U.S. Provisional Patent Application Ser. No. 61/677,427 filed Jul. 30, 2012 and is incorporated herein by reference in its entirety for all purposes.

This application also incorporates by reference in their entireties the following U.S. patents and patent application: U.S. Pat. No. 6,010,048; U.S. Pat. No. 8,393,508; US20100308091A1 titled RESILIENT INFILL; and Ser. No. 13/873,006 filed Apr. 29, 2013 titled RETENTION DOCK.

FIELD

The present disclosure generally relates to infill devices for a crossbar T-slot of a vehicle rack system.

INTRODUCTION

The popularity of recreational and competitive cycling, canoeing, rafting, kayaking, and skiing has grown substantially in recent years, with a corresponding expansion in the number of different items needing to be transported by a vehicle. As a result, the demand for carriers to transport items of varying dimensions and designs on cars and other vehicles also has grown significantly, and along with it the number and types of cargo-specific rack accessories that must be attached securely to a vehicle rack. In some embodiments, securely attaching a cargo-specific rack accessory to the vehicle rack involves inserting a cleat into a T-slot, channel, or cavity of a crossbar of the vehicle rack.

SUMMARY

In a first example, an infill has a base seated on a floor portion of a channel of a crossbar. A first side panel of the infill is connected to the base, contacts a first opposing side wall of the channel, and presses upward on a first opposing lip of the channel. A second side panel of the infill is connected to the base, contacts a second opposing side wall of the channel, and presses upward on a second opposing lip of the channel. The infill includes a cap or plug portion connected to and stepping up vertically from the first and second opposing side panels to fill a longitudinal opening of the crossbar. The longitudinal opening having a width defined between the first and second opposing lips. The infill is compressible from a flush position that substantially fills the longitudinal opening, to a compressed position inside the channel that allows for a retention device of a cargo-specific rack accessory to clamp the first and second opposing lips.

In a second example, a horizontally asymmetric infill is disposed in a cavity of a crossbar. The horizontally asymmetric infill includes a base seated on a floor portion of the cavity, and an upper portion cantilevered over the base in a region corresponding to a longitudinal opening that leads to the cavity. The longitudinal opening has a width defined between first and second opposing lips of the crossbar. The horizontally asymmetric infill is operable from a flush position that substantially fills the longitudinal opening, to a compressed position inside the cavity that allows for a retention device of a cargo-specific rack accessory to clamp the first and second opposing lips.

In a third example, an infill has a generally U-shaped cross-section and made is made of foam. A crossbar has a longitudinal opening to a channel. The opening has a width defined between first and second opposing lips. The channel has a floor portion connected to the first and second opposing lips by first and second opposing side walls. The infill has first and second outer walls connected to a central upper portion. The central upper portion presses upward on the first and second opposing lips. The first outer wall presses against the first opposing side wall and the floor portion. The second outer wall presses against the second opposing side wall and the floor portion. The infill is compressible from a flush position, wherein the central upper portion substantially fills the longitudinal opening, to a compressed position inside the channel that allows for a retention device of a cargo-specific rack accessory to clamp the first and second opposing lips.

In a fourth example, an infill has a generally D-shaped cross-section and made is made of foam. A crossbar has a longitudinal opening to a channel. The opening has a width defined between first and second opposing lips. The channel has a floor portion connected to the first and second opposing lips by first and second opposing side walls. The infill has an upper portion connected to a lower portion. The upper portion presses upward on the first and second opposing lips. The lower portion presses against the floor portion and the first and second opposing side walls. The infill is compressible from a flush position, wherein the upper portion substantially fills the longitudinal opening, to a compressed position inside the channel that allows for a retention device of a cargo-specific rack accessory to clamp the first and second opposing lips.

In a fifth example, a plurality of infill segments is disposed in a channel of a crossbar. The crossbar has a longitudinal opening to the channel. The opening has a width defined between first and second opposing lips. The channel has a floor portion connected to the first and second opposing lips by first and second opposing side walls. Each of the infill segments has an upper portion and a lower portion. The lower portion contacts the floor portion of the cavity. Each infill segment is operable between a flush position and a depressed position. The flush position corresponds to the upper portion of that infill segment substantially filling the opening. The depressed position corresponds to the upper portion of that infill segment moving away from the opening and toward the floor portion to allow for a retention device of a cargo-specific rack accessory to clamp the first and second opposing lips. The lower portion may include first and second opposing leaf springs made of a first material, such as a steel alloy. The upper portion may be made of a second material, such as polypropylene. The upper portion may be shaped to conform to lower surfaces of the first and second opposing lips.

In a sixth example, an infill includes a first component comprising a first material, such as rubber, and a second component comprising a second material, such as spring steel. The infill is disposed in a channel of a crossbar. The crossbar has a longitudinal opening to the channel. The opening has a width defined between first and second opposing lips. The channel has a floor portion connected to the first and second opposing lips by first and second opposing side walls. The second component contacts the floor portion, and may include a biasing device configured to press the first component upward against the first and second opposing lips. The first component may have a continuous length extending along a majority of a length of the channel.

DETAILED DESCRIPTION

Figure 1:
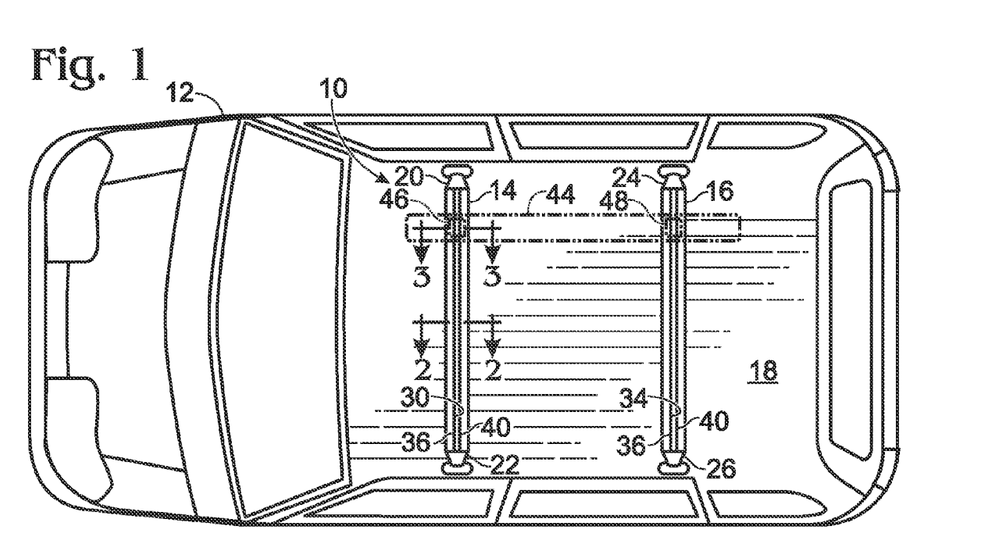
FIG. 1 is schematic top view of a vehicle rack coupled to a vehicle, according to the present disclosure.

FIG. 1 shows an illustrative vehicle rack crossbar system, generally indicated at 10, mounted to a vehicle 12. System 10 includes two crossbars 14 and 16 oriented perpendicular to an elongate axis and direction of travel of vehicle 12. Preferably, crossbars 14 and 16 are substantially rigid. For example crossbars 14 and 16 may be formed from extrusions of one or more metallic materials, such as aluminum or an aluminum alloy. Crossbars 14 and 16 are coupled to roof 18 of vehicle 12 by towers 20, 22, 24, and 26. Examples of suitable towers are described in U.S. Pat. No. 6,010,048 and U.S. Pat. No. 8,393, 508. Towers 20, 22, 24, and 26 may alternatively be described as legs or feet.

Each crossbar includes a lengthwise T-slot or channel, indicated at 30 and 34. Each channel has first and second opposing lips 36 and 40 having upper surfaces spaced apart by a generally constant and/or continuous distance. The channel may be described as a cavity having a longitudinal opening defined between opposing lips 36 and 40. Opposing lips 36 and 40 may form a partial ceiling of the cavity.

A cargo-specific rack accessory 44 may be mounted to crossbars 14 and 16 by retention devices 46 and 48, with each retention device having a body and a cleat, as described in Ser. No. 13/873,006 for example. The bodies of the retention devices may be seated on respective upper surfaces of crossbars 14 and 16, and the cleats may be inserted into the respective channels of the crossbars. Crossbars 14 and 16 may each be metal crossbars, with each metal crossbar having a one piece design to provide a rigid and/or secure mounting interface for retention devices 46 and 48. Retention devices 46 and 48 may secure accessory 44 to the crossbars by pinching opposing lips 36 and 40 of the respective crossbar between the body and the cleat of the respective retention device.

An infill of the present disclosure may be disposed in the channel and extend along the length of the channel. The infill may have a lower portion seated on a floor portion of the channel. The infill may be operable between a flush position, wherein an upper surface of an upper portion of the infill is substantially flush with the upper surface of the crossbar, and a compressed position, wherein the infill is locally compressed in the channel to allow the cleat to enter the channel and secure accessory 44 to the crossbar without removing the infill from the channel.

As vehicle 12 moves in the direction of travel (e.g., toward the left of the view), air passing over channels 30 and 34 may cause excessive noise. This noise may be reduced by the flush position of the infill in the channel of each crossbar.

Infills of the present disclosure may be described as "leave-in" infills. In contrast, previous infill designs typically required tearing or removal of the infill in order to secure an accessory to the channel.

Figure 2:
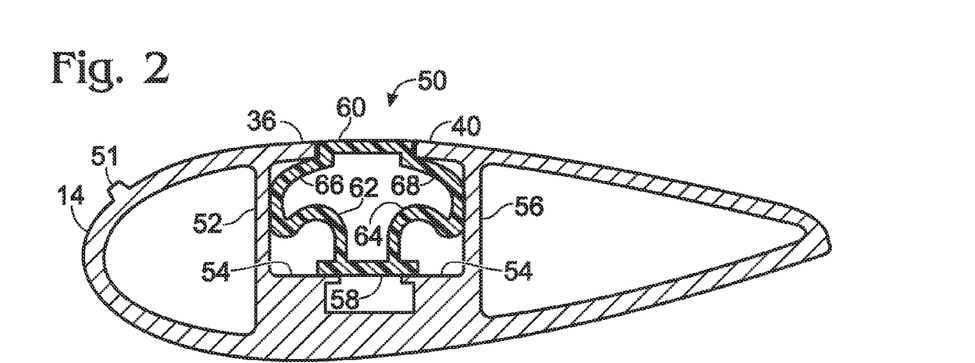
FIG. 2 is a cross-section of the vehicle rack taken along line 2-2 in FIG. 1, showing a flush position of an infill in a T-slot of a crossbar.

FIG. 2 shows a cross-section of crossbar 14 and a first exemplary infill, generally indicated at 50, in a flush position, the cross-section being taken along line 2-2 in FIG. 1. Crossbar 14 may have an aerodynamic cross-sectional shape similar or identical to the cross-sectional shape shown in FIG. 5 of US20100308091A1. For example, longitudinal bump 51 positioned on a nose portion of the crossbar may be rounded with a slightly convex forward facing surface and a slightly concave rear facing surface.

As described above, longitudinal channel 30 (see FIG. 1) may have a longitudinal opening. The longitudinal opening may have a width and height defined between first and second opposing lips 36 and 40. FIG. 2 (as well as FIGS. 3, 4, and 8) shows the width of the opening being constant through the height of the opening. In other words, FIG. 2 (as well as FIGS. 3, 4, and 8) shows first and second opposing lips 36 and 40 as having constant thicknesses. Stated differently, the opening may have a uniform width. In other words, edges of first and second opposing lips 36 and 40 defining the width and the height of the opening may extend substantially vertically. The edges of first and second opposing lips 36 and 40 may extend substantially perpendicular to the upper (or outer) surface of the crossbar, the upper surface of first and second opposing lips 36 and 40, and/or the lower surface of first and second opposing lips 36 and 40.

As shown in FIG. 2, the opening leads to the cavity, which has a generally rectangular shaped cross-section. The cavity has a first opposing sidewall 52 connecting a floor portion 54 of the cavity to the first opposing lip 36, and a second opposing sidewall 56 connecting floor portion 54 to second opposing lip 40, with opposing lips 36 and 40 forming the partial ceiling of the cavity.

As shown, infill 50 has a hollow interior and includes a base 58 connected to a cap or plug portion 60 by first and second curved walls 62 and 64, and first and second side panels 66 and 68. Base 58 may be seated on floor portion 54, and cap 60 may substantially seal the opening to the cavity between opposing lips 36 and 40. For example, side panels 66 and 68 may contact or press upward on opposing lips 36 and 40, and may contact or press outward on opposing side walls 52 and 56.

As shown in FIG. 2, cap 60 steps up vertically from side panels 66 and 68 with portions that parallel opposing edges of lips 36 and 40 and side walls 52 and 56. An upper surface of cap 60 may be substantially flush with the upper surface of crossbar 14 in a location where retention device 46 (see FIG. 1) is not clamped to opposing lips 36 and 40. The flush position of infill 50 may be defined as cap 60 substantially filling the opening between opposing lips 36 and 40. As described, the width of the opening may be constant through the height of the opening (e.g., from an upper surface of first and second opposing lips 36 and 40 to lower surfaces of first and second opposing lips 36 and 40). Plug portion 60 may be dimensioned to correspond to the dimensions of the opening (e.g., a height of plug portion 60 may substantially match the height of the opening, and a width of plug portion 60 may substantially match or be slightly narrower than the width of the opening).

As shown, cap portion 60 forms a first recessed angle with first opposing side panel 66, and a second recessed angle with the second opposing side panel 68, with the first and second recessed angles contacting edges of first and second opposing lips 36 and 40. The edges of first and second opposing lips 36 and 40 may be metallic edges. The first recessed angle contacting a metallic edge of opposing lip 36 and the second recessed angle contacting a metallic edge of opposing lip 40, may provide a synergistic combination of components and relationships thereof in reducing wind noise.

Figure 3:
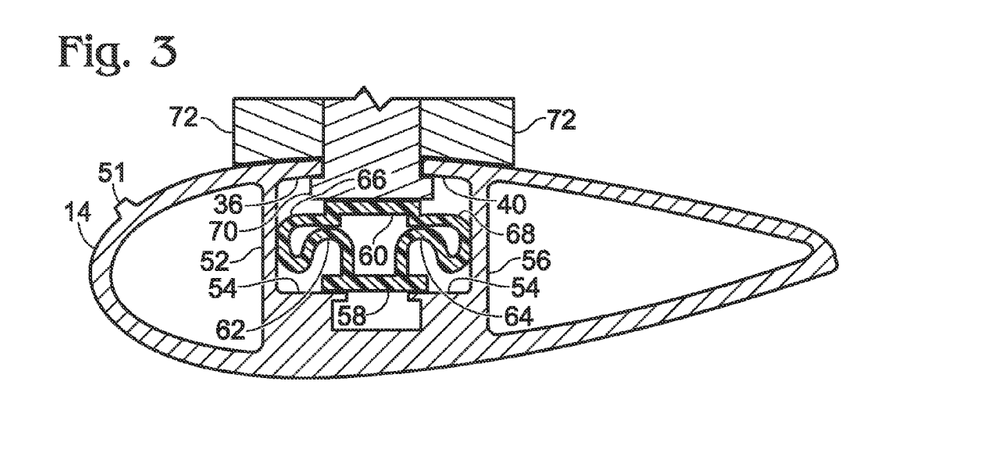
FIG. 3 is a cross-section of the vehicle rack taken along line 3-3 in FIG. 1, showing a cleat inserted and secured to the T-slot in a secured position and the infill in a compressed position.

FIG. 3 shows a cross-section of crossbar 14 and infill 50 in a compressed position, the cross-section being taken along the line 3-3 in FIG. 1. A cleat 70 and a body 72 of retention device 46 (see FIG. 1) are shown clamping opposing lips 36 and 40. As shown, insertion of cleat 70 into the cavity pushes cap 60 away from the opening and toward floor portion 54, resulting in the compressed position of infill 50.

When moving from the flush position to the compressed position, side panels 66 and 68 may be compressed toward floor portion 54, and curved walls 62 and 64 may further flex, bend, or be compressed toward floor portion 54.

Moving from the flush position to the compressed position may involve side panels 66 and 68 sliding downward on opposing surfaces of side walls 52 and 56.

In the compressed position, cleat 70 may contact cap 60 but not side panels 66 and 68. In other embodiments, cleat 70 may contact cap 60 and side panels 66 and 68 in the compressed position.

In the compressed position, side panel 66 may contact or press against curved wall 62, and side panel 68 may contact or press against curved wall 64. In other embodiments, side panel 66 and/or side panel 68 may not contact or press against respective curved walls 62 and 64 in the compressed position.

When cleat 70 is removed from the opening, infill 50 may return to the flush position shown in FIG. 2, thus infill 50 may be described as a resilient infill. Infill 50 may be formed from an extrusion of rubber, plastic, any other suitable resilient material, or combination thereof.

Figure 4:
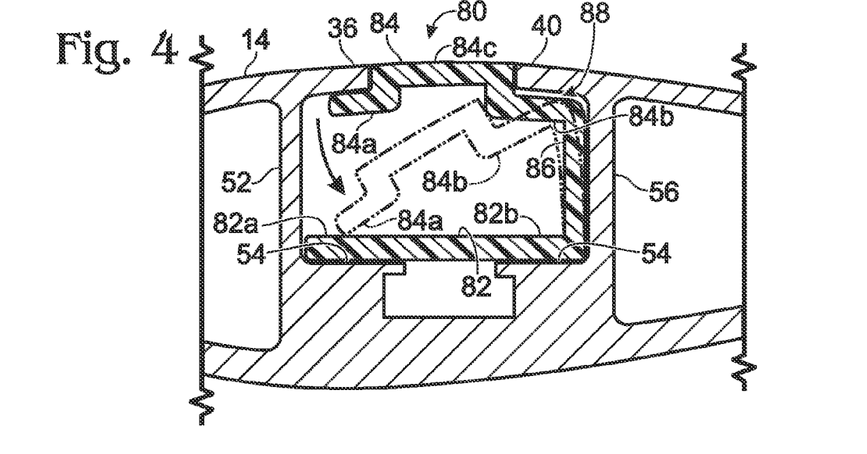
FIG. 4 is a partial cross-section similar to FIGS. 2-3, showing a cantilevered infill moving from a flush position toward a compressed position.

FIG. 4 shows a cross-section of a second exemplary infill, generally indicated at 80, disposed in the cavity of crossbar 14. Infill 80 drawn in solid lines corresponds to a flush position of infill 80 and to a cross-section of infill 80 taken along the line 2-2 in FIG. 1. Infill 80 drawn in dash double dot lines corresponds to a compressed position of infill 80 and to a cross-section of infill 80 taken along the line 3-3 in FIG. 1. Retention device 46 has been removed from FIG. 4 to simplify the drawing. As shown, infill 80 is horizontally asymmetric in the flush and compressed positions. As shown, infill 80 includes a base 82 having first and second end portions 82a and 82b, an upper portion 84 having first and second end portions 84a and 84b, and a side panel 86 connecting second end portion 82b of base 82 to second end portion 84b of upper portion 84. Base 82 may be seated on floor portion 54. First end portion 82a may contact or press against side wall 52, and second end portion 82b may contact or press against side wall 56. Side panel 86 may extend along, contact, and/or press against side wall 56. Upper portion 84 may be cantilevered over base 82 in a region corresponding to the longitudinal opening, and a cap or plug portion 84c of upper portion 84 may substantially fill the longitudinal opening in the flush position. For example, infill 80 may be compressed in the cavity in the flush position away from an equilibrium position of infill 80, resulting in first end portion 84a pressing upward on lip 36.

A cantilevered member may be defined as a member (e.g., upper portion 84) supported at only one end portion (e.g., second end portion 84b) and carrying a load on the other end portion (e.g., first end portion 84a) or along the length of the member (e.g., along a length of upper portion 84 from first end portion 84a to second end portion 84b).

Upper portion 84 may be described as being connected to and/or cantilevered over base 82 by a resilient and/or living hinge. The living hinge may include a juncture of second end portion 84b to side panel 86, and/or a juncture of second end portion 82b to side panel 86. Thicknesses of base 82, side panel 86, and upper portion 84 may be varied to improve the resiliency, restorative force, and/or flexibility of the living hinge.

Similar to plug portion 60 of infill 50 (see FIG. 2), plug portion 84c of infill 80 may be dimensioned to correspond to the constant width of the opening through the height of the opening.

Second end portion 84b may be tensioned or biased toward lip 40. However, infill 80 may be structured to provide for a gap 88 between the lower surface of lip 40 and an upper surface of second end portion 84b. For example, the upper surface of second end portion 84b may be disposed further from the lower surface of second opposing lip 40 than an upper surface of first end portion 84a is from the lower surface of first opposing lip 36 in the flush position. In other words, a step between the upper surface of second end portion 84b and an upper surface of cap portion 84c may have a greater height than a step between the upper surface of first end portion 84a and the upper surface of cap portion 84c.

As shown, infill 80 is operable between the flush position that substantially fills the longitudinal opening of crossbar 14, and the compressed position inside the cavity that may allow for cleat 70 (see FIG. 3) to pass through the longitudinal opening into the cavity and clamp opposing lips 36 and 40.

Cleat 70 (see FIG. 3) may press against cap portion 84c, resulting in upper portion 84 pivoting away from the longitudinal opening. For example, first end portion 84a may pivot toward floor portion 54, which may cause side panel 86 to flex away from side wall 56. As shown, an upper portion of side panel 86 flexes further away from side wall 56 than a lower portion of side panel 86 as infill 80 moves from the flush position to the compressed position.

In the compressed position, first end portion 84a of upper portion 84 may be closer to floor portion 54 than second end portion 84b is to floor portion 54. In the compressed position, first end portion 84a may contact base 82 distal from first end portion 82a of base 82.

Infill 80 may be described as a horizontally asymmetric infill having a substantially C-shaped cross-section, with a mouth of the C-shaped cross-section facing first opposing side wall 52 of the channel and being opposite side panel 86. Movement of infill 80 from the flush position to the compressed position may narrow a width of the mouth (e.g. a distance between first end portion 84a of upper portion 84 and first end portion 82a of base 82), and movement of infill 80 from the compressed position to the flush position may widen the width of the mouth. Side panel 86 may contact second opposing side wall 56 when upper portion 84 substantially seals the longitudinal opening of the cavity. Side panel 86 may locally pivot away from (or bend away from) second opposing side wall 56 when upper portion 84 is locally depressed toward floor portion 54.

In some embodiments, side panel 86 may not contact second opposing side wall 56, and/or side panel may be disposed closer to first opposing side wall 52 and second opposing side wall 56. For example, infill 80 may be reversed in the channel such that the mouth of the C-shaped cross-section faces second opposing side wall 56 and faces away from the direction of travel of the vehicle (see FIG. 1).

When cleat 70 (see FIG. 3) is removed from the opening, infill 80 may return or flex back to the flush position, thus infill 80 may be described as a resilient infill. Infill 80 may be formed from an extrusion of rubber, plastic, or any other suitable resilient material.

As shown in FIG. 4, cap portion 84c vertically projects from first and second end portions 84a and 84b to substantially fill the longitudinal opening in the flush position. In other embodiments, opposing lips 36 and 40 may have tapered portions, which taper toward one another, in which case, upper portion 84 may include first and second opposing ramp portions that conform to these tapered portions. Further, the tapered portions may include concavely curved surfaces and the ramp portions may include convexly curved surfaces configured to contact or press against the concavely curved surfaces of the tapered portions.

Figure 5:
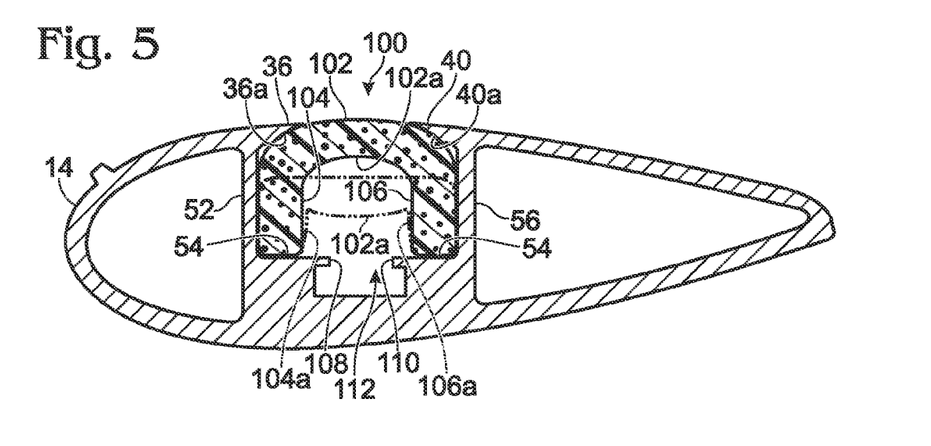
FIG. 5 is a cross-section similar to FIGS. 2-3, showing a U-shaped foam infill moving from a flush position toward a compressed position.

FIG. 5 shows a cross-section of a third exemplary infill, generally indicated at 100, disposed in the cavity of crossbar 14 (shown here with opposing lips 36 and 40 including the previously mentioned tapered portions with concavely curved surfaces). Infill 100 drawn in solid lines corresponds to a flush position of infill 100 and to a cross-section of infill 100 taken along the line 2-2 in FIG. 1. Infill 100 drawn in dash double dot lines corresponds to a compressed position of infill 100 and to a cross-section of infill 100 taken along the line 3-3 in FIG. 1. Retention device 46 has been removed from FIG. 5 to simplify the drawing.

Infill 100 may be made of open-celled foam and/or closed-celled foam. For example, infill 100 may be made of an extrusion of open-celled foam, closed-celled foam, or a combination thereof. The foam of infill 100 may have a density in a range of 0.8 to 10.0 pounds per cubic foot (PCF), and an indentation load deflection (IFD) in a range of 5-95%.

As shown, infill 100 has a generally U-shaped cross-section with a central upper portion 102 connected to respective top portions of first and second outer walls 104 and 106. Central upper portion 102 substantially fills and/or seals the longitudinal opening between opposing lips 36 and 40 in the flush position. Respective bottom portions of outer walls 104 and 106 are seated on or press against floor portion 54 of the channel. An upper surface of central upper portion 102 is continuously convexly curved and contacts or presses against tapered portions 36a and 40a of opposing lips 36 and 40.

Portions of infill 100 contacting tapered portions 36a and 40a of opposing lips 36 and 40 may be described as first and second opposing ramp portions that are convexly curved.

As shown, convexly curved portions of upper portion 102 contact and may conform to concavely curved surfaces of tapered portions 36a and 40a.

In other embodiments, upper portion 102 may include a plug portion similar to plug portion 60 (see FIG. 2), and first and second opposing lips 36 and 40 may define an opening similar to the opening shown in FIG. 2. The plug portion of upper portion 102 may be dimensioned to correspond to a constant width of the opening through a height of the opening.

Clamping opposing lips 36 and 40 may involve inserting cleat 70 (see FIG. 3) into the longitudinal opening, which may push down (or move) infill 100 to the compressed position.

Moving infill 100 from the flush position to the compressed position may involve the top portions of outer walls 104 and 106 sliding downward against respective first and second opposing side walls 52 and 56 of the channel.

Moving infill 100 from the flush position to the compressed position may cause a lower surface 102a of central upper portion 102 to flex from being concavely curved to being substantially flat to being convexly curved.

Moving infill 100 from the flush position to the compressed position may involve inner surfaces 104a and 106a of outer walls 104 and 106 bulging toward the center of the cavity.

In the flush and compressed positions, infill 100 may bridge an opening in floor portion 54 defined between a secondary pair of opposing lips 108 and 110, with the opening in floor portion 54 leading to a secondary cavity 112. As shown, infill 100 may not contact opposing lips 108 and 110 in either the flush or compressed positions.

When the cleat is removed from the opening, infill 100 may return to the flush position, thus infill 100 may be described as a resilient infill.

Figure 6:
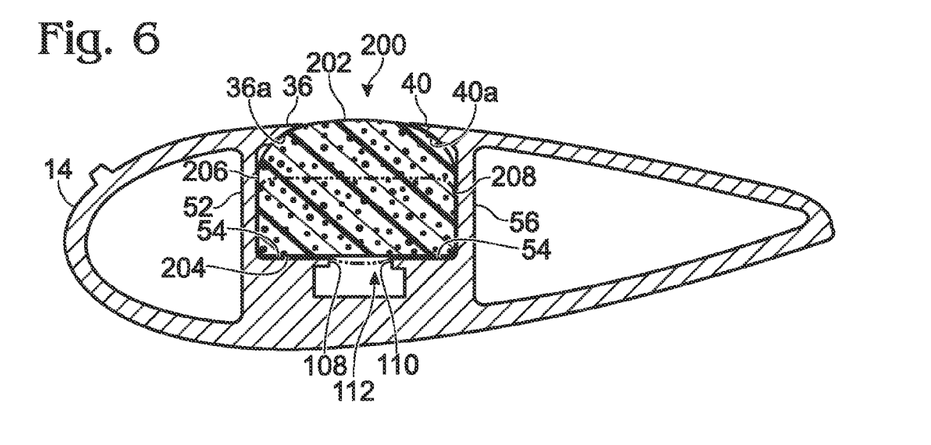
FIG. 6 is a cross-section similar to FIGS. 2-3, showing a D-shaped foam infill moving from a flush position toward a compressed position.

FIG. 6 shows a cross-section of a fourth exemplary infill, generally indicated at 200, disposed in the cavity of crossbar 14 (shown here with opposing lips 36 and 40 including tapered portions 36a and 40a with concavely curved surfaces). Infill 200 drawn in solid lines corresponds to a flush position of infill 200 and to a cross-section of infill 200 taken along the line 2-2 in FIG. 1. Infill 200 drawn in dash double dot lines corresponds to a compressed position of infill 200 and to a cross-section of infill 200 taken along the line 3-3 in FIG. 1. Retention device 46 has been removed from FIG. 6 to simplify the drawing.

Infill 200 may be made of open-celled foam or closed-celled foam. For example, infill 100 may be made of an extrusion of open-celled foam, closed-celled foam, or a combination thereof. The foam of infill 200 may have a density in a range of 0.8 to 10.0 pounds per cubic foot (PCF), and an indentation load deflection (IFD) in a range of 5-95%.

As shown, infill 200 has a generally D-shaped cross-section with an upper portion 202 connected to a base or lower portion 204. Upper portion 202 substantially fills and/or seals the longitudinal opening between opposing lips 36 and 40 in the flush position. Base portion 204 is seated on or presses against floor portion 54 of the channel. An upper surface of upper portion 202 is continuously convexly curved and contacts or presses against tapered portions 36a and 40a of opposing lips 36 and 40. As shown, convexly curved portions of upper portion 202 contact and may conform to concavely curved surfaces of tapered portions 36a and 40a, and outer wall surfaces 206 and 208 of infill 200 contact respective first and second opposing side walls 52 and 56 of the channel.

In other embodiments, upper portion 202 may include a plug portion similar to plug portion 60 (see FIG. 2), and first and second opposing lips 36 and 40 may define an opening similar to the opening shown in FIG. 2. The plug portion of upper portion 202 may be dimensioned to correspond to a constant width of the opening through a height of the opening.

Clamping opposing lips 36 and 40 may involve inserting cleat 70 (see FIG. 3) into the longitudinal opening, which may push down (or move) infill 200 to the compressed position.

Moving infill 200 from the flush position to the compressed position may involve the upper portions of outer walls surfaces 206 and 208 of infill 200 sliding downward against respective first and second opposing side walls 52 and 56 of the channel.

Moving infill 200 from the flush position to the compressed position may cause the upper surface of upper portion 202 to flex from being convexly curved to being substantially flat to possibly being concavely curved.

Moving infill 200 from the flush position to the compressed position may cause a lower surface of base portion 204 to bulge downward between second pair of opposing lips 108 and 110.

When the cleat is removed from the opening, infill 200 may return to the flush position, thus infill 200 may be described as a resilient infill.

Figure 7:
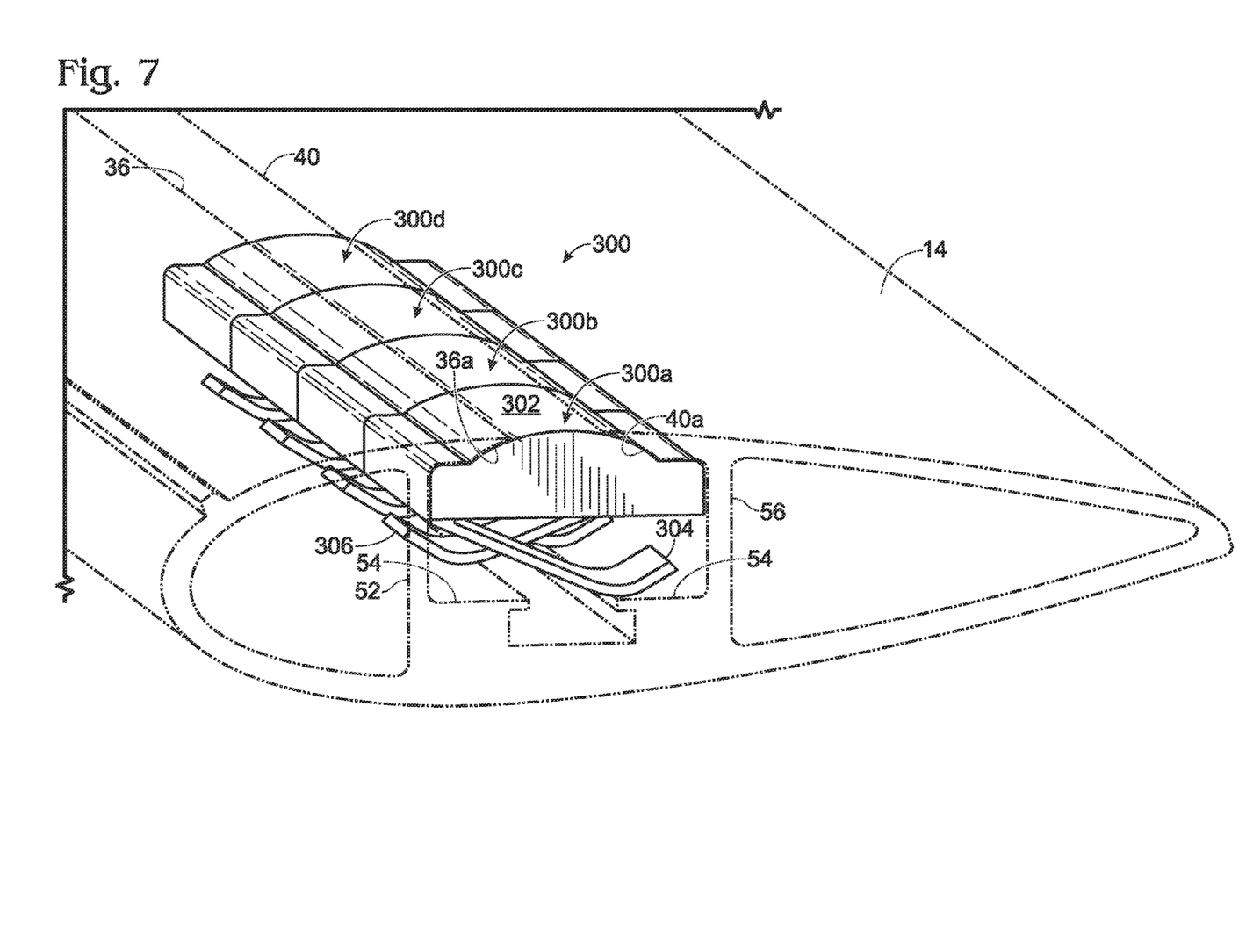
FIG. 7 is a perspective view of a plurality of spring-loaded infill segments stacked up in a T-slot of a crossbar, according to aspects of the present disclosure.

FIG. 7 shows a fifth example of an infill, generally indicated at 300, disposed in the channel of crossbar 14 in a flush position. Infill 300 may include a first component made of a first material having a first compositional characteristic, such as a rigid material having a relatively high rigidity and a relatively low resiliency or elasticity. Infill 300 may include a second component made of a second material having a second compositional characteristic, such as a resilient material having a relatively low rigidity and relatively high resiliency or elasticity. The second component may be configured to bias or press the first component upward against the partial ceiling of the channel.

Infill 300 may include a plurality of infill segments stacked up in the channel, along a majority of the length of the channel or along the entire length of the channel. However, only four infill segments, generally indicated at 300a, 300b, 300c, and 300d, are shown stacked up in the channel in order to simplify the drawing.

Each infill segment may include an upper portion 302 connected to a biasing device. The biasing device may include one or more springs, such as first and second opposing leaf springs 304 and 306. First and second opposing leaf springs may be connected to a lower surface of upper portion 302 and bias upper portion 302 toward first and second opposing lips 36 and 40 and the partial ceiling of the channel, which may also involve convexly curved portions of upper portion 302 pressing against concavely curved tapered portions 36a and 40a.

In other embodiments, upper portion 302 may include a plug portion similar to plug portion 60 (see FIG. 2), and first and second opposing lips 36 and 40 may define an opening similar to the opening shown in FIG. 2. The plug portion of upper portion 302 may be dimensioned to correspond to a constant width of the opening through a height of the opening.

Upper portion 302 may be comprised of the first material, such as polypropylene or a hardened elastomeric material. First and second leaf springs may be comprised of the second material, such as spring steel or a steel alloy. If upper portion 302 is made of a relatively flexible material, such as rubber, then the upper portion of infill 300 may have a continuous length (e.g., not segmented) extending along a majority of the length of the channel.

An upper end portion of first leaf spring 304 may be connected to upper portion 302 near first opposing side wall 52 of the channel. A lower end portion of first leaf spring 304 may press against floor portion 54 near second opposing side wall 56, and curve away from floor portion 54 and toward second opposing lip 40.

An upper end portion of second leaf spring 306 may be connected to upper portion 302 near second opposing side wall 56 of the channel. A lower end portion of first leaf spring 306 may press against floor portion 54 near first opposing side wall 52, and curve away from floor portion 54 and toward first opposing lip 36.

Upper portion 302 may be dimensioned so that cleat 70 (see FIG. 3) inserted into the channel only compresses one of the infill segments to a compressed or depressed position, which may involve compressing the biasing device (e.g., leaf springs 304 and 306) away from an equilibrium position.

Infill 300 may be described as a resilient infill. For example, when cleat 70 is removed from the channel, a restorative force from the biasing device of that infill segment may push the upper portion of that infill segment back to the flush position as the biasing device moves back toward the equilibrium position.

Infill 300 may have a horizontally asymmetric cross-section disposed in the cavity. For example, a cross-section of infill 300 taken in a vertical plane parallel to the direction of travel of the vehicle (see FIG. 1) may be horizontally asymmetric (e.g., the cross-section may pass through one of the first and second opposing leaf springs but not the other of the first and second opposing leaf springs).

Figure 8:
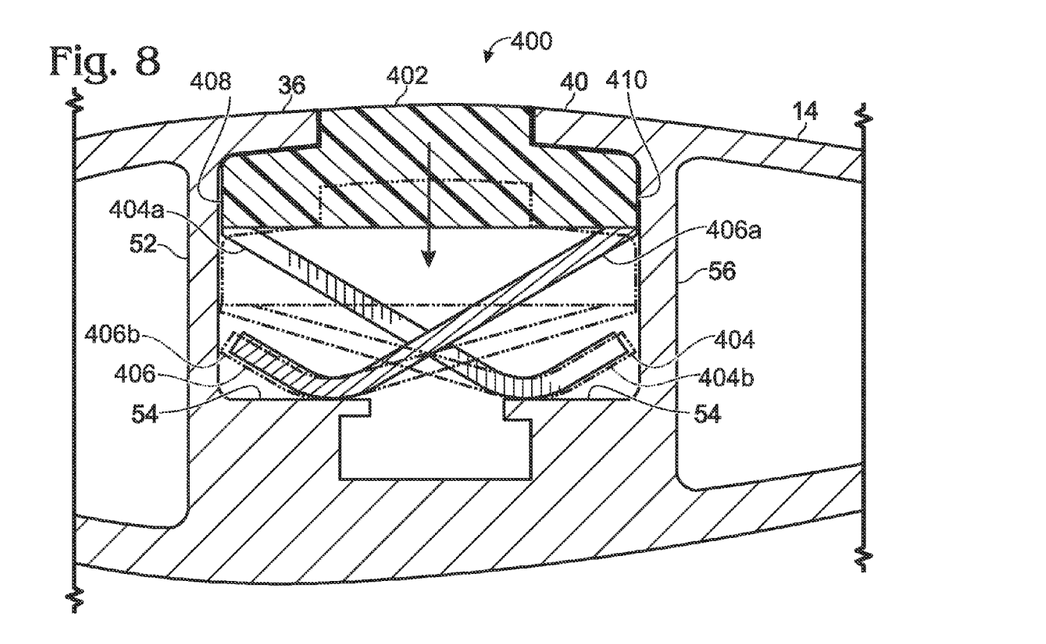
FIG. 8 is a cross-section similar to FIG. 4, showing a spring-loaded infill moving from a flush position toward a compressed position.

FIG. 8 shows a cross-section of a sixth exemplary infill, generally indicated at 400, disposed in the cavity of crossbar 14 (shown here with opposing lips 36 and 40 similar to FIGS. 2-4). Infill 400 drawn in solid lines corresponds to a flush position of infill 400 and to a cross-section of infill 400 taken along the line 2-2 in FIG. 1. Infill 400 drawn in dash double dot lines corresponds to a compressed or depressed position of infill 400 and to a cross-section of infill 400 taken along the line 3-3 in FIG. 1. Retention device 46 has been removed from FIG. 8 to simplify the drawing.

The movement of infill 400 between the flush position and depressed position shown and described in relation to FIG. 8, may also describe the movement of one or more of the infill segments of FIG. 7 as those one or more infill segments move between the flush and depressed positions.

Infill 400 may include a first component (e.g., an upper portion 402) connected to a second component (e.g., a biasing device, such as first and second opposing leaf springs 404 and 406). Upper portion 402 substantially fills and/or seals the opening between first and second opposing lips 36 and 40 in the flush position.

As shown in FIG. 8, upper portion 402 may include a plug portion dimensioned to correspond to the constant width of the opening through the height of the opening defined between opposing lips 36 and 40, similar to plug portion 60 (see FIG. 2) and plug portion 84c (see FIG. 4).

First and second opposing leaf springs 404 and 406 may be connected to a lower surface of upper portion 402 and bias (or push) upper portion 402 toward (or upwardly against) first and second opposing lips 36 and 40 and the partial ceiling of the channel.

Upper portion 402 may be made of a third material having a third compositional characteristic, such as a material having a relatively high flexibility and a relatively low rigidity, such as rubber. First and second leaf springs 404 and 406 may be made of the second material.

An upper end portion 404a of first leaf spring 404 may be connected to upper portion 402 near first opposing side wall 52 of the channel. A lower end portion 404b of first leaf spring 404 may press against floor portion 54 near second opposing side wall 56, and curve away from floor portion 54 and toward second opposing lip 40.

An upper end portion 406a of second leaf spring 406 may be connected to upper portion 402 near second opposing side wall 56 of the channel. A lower end portion 406b of first leaf spring 406 may press against floor portion 54 near first opposing side wall 52, and curve away from floor portion 54 and toward first opposing lip 36.

Inserting cleat 70 (see FIG. 3) into the channel may cause the infill 400 to move from the flush position to the depressed position.

Moving infill 400 from the flush position to the depressed position may involve opposing side surfaces 408 and 410 of upper portion 402 sliding downward along respective first and second opposing side walls 52 and 56.

Moving infill 400 from the flush position to the depressed position may involve first opposing leaf spring 404 sliding on floor portion 54 toward second opposing side wall 56, and lower end portion 404b contacting or pressing against second opposing side wall 56.

Moving infill 400 from the flush position to the depressed position may involve second opposing leaf spring 406 sliding on floor portion 54 toward first opposing side wall 52, and lower end portion 406*b* contacting or pressing against second opposing side wall 52.

Moving infill 400 from the flush position to the depressed position may involve the first and second components moving away from the opening and toward floor portion 54.

Infill 400 may be described as a resilient infill. For example, moving infill 400 from the flush position to the depressed position may involve loading the biasing device away from an equilibrium position to provide a restorative force that pushes upper portion 402 upward to the flush position when the cleat is removed from the channel.

Infill 400 may have a horizontally asymmetric cross-section disposed in the cavity. For example, FIG. 8 shows a cross-section of infill 400 taken in a vertical plane parallel to the direction of travel of the vehicle, in which the cross-section passes through second opposing leaf spring 406 but not first opposing leaf spring 404.

Vehicle rack crossbar systems, according to the present disclosure, may be described by the following numbered paragraphs:

A0. A vehicle rack crossbar system comprising:

a crossbar having a longitudinal opening to a channel having first and second opposing side walls connected to a floor portion, the opening having a width defined between first and second opposing lips, the floor portion being connected to the first and second opposing lips by the first and second opposing side walls; and an infill having a base seated on the floor portion of the channel, a first side panel being connected to the base and contacting the first opposing side wall and pressing upward on first opposing lip but not contacting the floor portion, a second side panel connected to the base and contacting the second opposing side wall and pressing upward on the second opposing lip but not contacting the floor portion, and a cap portion connected to the first and second opposing side panels, the cap portion stepping up vertically from the first and second opposing side panels to fill the longitudinal opening.

A1. The vehicle rack crossbar system of paragraph A0, wherein the cap portion substantially seals the longitudinal opening by contacting the first and second opposing lips.

A2. The vehicle rack crossbar system of paragraph A1, wherein an upper surface of the cap portion is substantially flush with an upper surface of the crossbar.

A3. The vehicle rack crossbar system of paragraph A0, wherein the cap portion forms a first recessed angle with the first opposing side panel, and a second recessed angle with the second opposing side panel, the first and second recessed angles contacting metallic edges of the first and second opposing lips.

A4. The vehicle rack crossbar system of paragraph A3, wherein the longitudinal opening is defined between the metallic edges of the first and second opposing lips.

A5. The vehicle rack crossbar system of paragraph A0, wherein the infill is compressible from a flush position that substantially fills the longitudinal opening to a compressed position inside the channel that allows for a retention device of a cargo-specific rack accessory to clamp the first and second opposing lips.

A6. The vehicle rack crossbar system of paragraph A5, wherein the first opposing side panel is connected to the base by a first curved wall, the second opposing side panel is connect to the base by a second curved wall, and compression of the infill from the flush position to the compressed position causes the first opposing side panel to contact the first curved wall distal the first opposing side wall of the cavity, and the second opposing side panel to contact the second curved wall distal the second opposing side wall of the cavity.

A7. The vehicle rack crossbar system of paragraph A0, wherein the infill is an extrusion of elastomeric material.

A8. The vehicle rack crossbar system of paragraph A0, wherein the crossbar is a metallic extrusion.

A9. The vehicle rack crossbar system of paragraph A0, wherein the infill is resilient.

A10. The vehicle rack crossbar system of paragraph A0, wherein the infill has a hollow interior.

B0. A vehicle rack crossbar system comprising:

a crossbar having a longitudinal opening to a cavity having first and second opposing side walls connected to a floor portion, the opening having a width defined between first and second opposing lips, the floor portion being connected to the first and second opposing lips by the first and second opposing side walls; and a horizontally asymmetric infill disposed in the cavity, the horizontally asymmetric infill being operable from a flush position that substantially fills the longitudinal opening, to a compressed position inside the cavity that allows for a retention device of a cargo-specific rack accessory to clamp the first and second opposing lips.

B1. The vehicle rack crossbar system of paragraph B0, wherein the horizontally asymmetric infill includes a base seated on the floor portion, and an upper portion cantilevered over the base in a region corresponding to the longitudinal opening, the upper portion substantially filling the longitudinal opening in the flush position.

B2. The vehicle rack crossbar system of paragraph B1, wherein the base has a first end portion proximal the first opposing side wall and a second end portion proximal the second opposing side wall, the upper portion having a first end portion proximal the first opposing side wall and a second end portion proximal the second opposing side wall, the infill including a side panel connecting the second end portion of the base to the second end portion of the upper portion, the infill having a generally C-shaped cross-section with a mouth of the C-shaped cross-section facing the first opposing side wall, the mouth having a width defined between the first end portion of the base and the first end portion of the upper portion.

B3. The vehicle rack crossbar system of paragraph B2, wherein the first end portion of the base contacts the first opposing side wall, and the side panel contacts the second opposing side wall.

B4. The vehicle rack crossbar system of paragraph B2, wherein the first end portion of the upper portion is closer to the floor portion than the second end portion of the upper portion is to the floor portion in the compressed position.

B5. The vehicle rack crossbar system of paragraph B2, wherein the side panel flexes away from the second opposing side wall as the infill moves from the flush position toward the compressed position.

B6. The vehicle rack crossbar system of paragraph B2, wherein the flush position, the first end portion of the upper portion presses upward against the first opposing lip, and the second end portion of the upper portion is separated from the second opposing lip by a gap.

B7. The vehicle rack crossbar system of paragraph B0, wherein the upper portion includes a vertically projecting step portion than fills the longitudinal opening in the flush position.

B8. The vehicle rack crossbar system of paragraph B0, wherein the upper portion includes a first opposing ramp portion that conforms to a tapered portion of the first opposing lip, and a second opposing ramp portion that conforms to a tapered portion of the second opposing lip.

B9. The vehicle rack crossbar system of paragraph B8, wherein the first and second tapered portions include concavely curved surfaces, and the ramp portions are convexly curved.

B10. The vehicle rack crossbar system of paragraph B0, wherein the infill is an extrusion of a polymeric material.

C0. A vehicle rack crossbar system comprising:
a crossbar having a longitudinal opening to a channel having first and second opposing side walls connected to a floor portion, the opening having a width defined between first and second opposing lips, the floor portion being connected to the first and second opposing lips by the first and second opposing side walls; and
a horizontally asymmetric infill having an upper portion substantially sealing the longitudinal opening in a flush position, and a base portion seated on the floor portion, wherein upper portion is locally depressible toward the floor portion to a compressed position to allow for a retention device to enter the cavity to clamp the opposing lips.

C1. The vehicle rack crossbar system of paragraph C0, wherein the horizontally asymmetric infill has a substantially C-shaped cross-section, with a mouth of the C-shaped cross-section facing the first opposing side wall of the channel.

C2. The vehicle rack crossbar system of paragraph C1, wherein the horizontally asymmetric infill includes a side panel connecting the upper portion to the base, the side panel being distal the first opposing side wall and proximal the second opposing side wall.

C3. The vehicle rack crossbar system of paragraph C2, wherein the side panel contacts the second opposing side wall when the upper portion substantially seals the longitudinal opening, and pivots away from the second opposing side wall when the upper portion is locally depressed toward the floor portion.

C4. The vehicle rack crossbar system of paragraph C2, wherein moving the infill from the flush position toward the compressed position reduces a width of the mouth.

C5. The vehicle rack crossbar system of paragraph C4, wherein the infill exerts an upward force on the upper portion toward the first and second opposing lips when the retention device is removed from the channel, and presses the upper portion upward against at least one of the opposing lips.

C6. The vehicle rack crossbar system of paragraph C2, wherein the upper portion has a first end portion and a second end portion, the first end portion being proximal the first opposing side wall and distal the second opposing side wall, the second end portion being proximal the second opposing side wall and distal the first opposing side wall, the side panel connecting the second end portion of the upper portion to the base, the first end portion of the upper portion being disposed further from the first opposing side wall than the second end portion of the upper portion is disposed from the second opposing side wall when the upper portion substantially seals the longitudinal opening.

C7. The vehicle rack crossbar system of paragraph C6, wherein the first end portion of the upper portion presses against the first opposing lip, and the second end portion of the upper portion is separated from the second opposing lip by a gap.

D0. A vehicle rack crossbar system comprising:
a crossbar having a longitudinal opening to a channel having first and second opposing side walls connected to a floor portion, the opening having a width defined between first and second opposing lips, the floor portion being connected to the first and second opposing lips by the first and second opposing side walls; and
an infill having a base seated on the floor portion of the channel, and an upper portion substantially sealing the longitudinal opening, wherein the upper portion is cantilevered over the base in a region corresponding to the longitudinal opening.

D1. The vehicle rack crossbar system of paragraph D0, wherein the infill is operable between a flush position corresponding to the upper portion pressing upward on at least one of the opposing lips, and a compressed position allowing for a cleat of a retention device to enter the channel.

D2. The vehicle rack crossbar system of paragraph D1, wherein the infill is compressed in the channel in the flush position.

E0. A vehicle rack crossbar system comprising:
a crossbar having a longitudinal opening to a channel having first and second opposing side walls connected to a floor portion, the opening having a width defined between first and second opposing lips, the floor portion being connected to the first and second opposing lips by the first and second opposing side walls; and
an infill disposed in the channel, the infill being compressible from a flush position that substantially fills the longitudinal opening to a compressed position inside the channel that allows for a retention device of a cargo-specific rack accessory to clamp the first and second opposing lips, the infill being made of foam.

E1. The vehicle rack crossbar system of paragraph E0, wherein the infill is made of open-celled foam.

E2. The vehicle rack crossbar system of paragraph E0, wherein the infill is made of closed-cell foam.

E3. The vehicle rack crossbar system of paragraph E0, wherein the infill has a substantially U-shaped cross-section.

E4. The vehicle rack crossbar system of paragraph E0, wherein the infill has a substantially D-shaped cross-section.

F0. A vehicle rack crossbar system comprising:
a crossbar having a longitudinal opening to a channel having first and second opposing side walls connected to a floor portion, the opening having a width defined between first and second opposing lips, the floor portion being connected to the first and second opposing lips by the first and second opposing side walls; and
an infill disposed in the channel, the infill including a first component made of a first material and a second component made of a second material that is different than the first material, the second component being configured to press the first component upward against at least one of the opposing lips, the infill being movable from a flush position corresponding to the first component substantially filling the longitudinal opening to a depressed position corresponding to the first component being pressed toward the floor portion of the channel to allow for a retention device of a cargo-specific rack accessory to clamp the first and second opposing lips.

F1. The vehicle rack crossbar system of paragraph F0, wherein an upper surface of the first component is substantially flush with an upper surface of the crossbar in the flush position.

F2. The vehicle rack crossbar system of paragraph F0, wherein the first material includes a polymer, and the second material includes a metal.

F3. The vehicle rack crossbar system of paragraph F2, wherein the second component includes a spring.

F4. The vehicle rack crossbar system of paragraph F2, wherein the second component includes first and second opposing leaf springs.

F5. The vehicle rack crossbar system of paragraph F4, wherein an upper portion of the first opposing leaf spring is connected to the first component closer to the first opposing side wall than the second opposing side wall, and the an upper portion of the second opposing leaf spring is connected to the first component closer to the second opposing side wall than the first opposing side wall.

F6. The vehicle rack crossbar system of paragraph F5, wherein a lower portion of the first opposing leaf spring presses against the floor portion closer to the second opposing side wall than the first opposing side wall, and a lower portion of the second opposing leaf spring presses against the floor portion closer to the first opposing side wall than the second opposing side wall.

G0. A vehicle rack crossbar system comprising:
a crossbar having a longitudinal opening to a cavity having first and second opposing side walls connected to a floor portion, the opening having a width defined between first and second opposing lips, the floor portion being connected to the first and second opposing lips by the first and second opposing side walls; and
an infill disposed in the cavity, the infill including a first component made of a first material and a second component made of a second material, the first material being different than the second material, the infill being operable between a flush position corresponding to the first component substantially filling the opening and a depressed position corresponding to the first and second components moving closer to the floor portion of the cavity to allow a retention device of a cargo-specific accessory to clamp the first and second opposing lips.

G1. The vehicle rack crossbar system of paragraph G0, wherein the first material is more rigid than the second material.

G2. The vehicle rack crossbar system of paragraph G0, wherein the second material is more resilient than the first material.

G3. The vehicle rack crossbar system of paragraph G2, wherein the second material includes steel alloy.

G4. The vehicle rack crossbar system of paragraph G0, wherein the second component includes a biasing device.

G5. The vehicle rack crossbar system of paragraph G4, wherein the biasing device includes a spring.

G6. The vehicle rack crossbar system of paragraph G4, wherein the biasing device includes first and second opposing leaf springs.

G7. The vehicle rack crossbar system of paragraph G0, wherein the first component is segmented into a plurality of segments, at least one of the segments being dimensioned so that depression of one of the at least one segments to the depressed position does not result in depression of an adjacent segment toward the floor portion.

H0. A vehicle rack crossbar system comprising:
a crossbar having a longitudinal opening to a cavity having first and second opposing side walls connected to a floor portion, the opening having a width defined between first and second opposing lips, the floor portion being connected to the first and second opposing lips by the first and second opposing side walls; and
a plurality of infill segments disposed in the cavity, each of the infill segments having an upper portion and a lower portion, the lower portion contacting the floor portion of the cavity, each infill segment being operable between a flush position corresponding to the upper portion of that infill segment substantially filling the opening and a depressed position corresponding to the upper portion of that infill segment moving away from the opening and toward the floor portion to allow for a retention device of a cargo-specific accessory to clamp the first and second opposing lips.

H1. The vehicle rack crossbar system of paragraph H0, wherein at least one of the infill segments is dimensioned so that movement of one of the at least one infill segments to the depressed position does not cause an adjacent infill segment to move to the depressed position.

H2. The vehicle rack crossbar system of paragraph H0, wherein at least one of the infill segments includes a biasing device configured to press that infill segment upward against at least one of the opposing lips.

H3. The vehicle rack crossbar system of paragraph H2, wherein the biasing device includes a spring.

H4. The vehicle rack crossbar system of paragraph H2, wherein the biasing device includes a leaf spring.

H5. The vehicle rack crossbar system of paragraph H2, wherein the biasing device includes first and second opposing leaf springs.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A vehicle rack crossbar system comprising:
a crossbar having a longitudinal opening to a channel having first and second opposing side walls connected to a floor portion, the opening having a width defined between first and second opposing lips, the floor portion being connected to the first and second opposing lips by the first and second opposing side walls; and
an infill disposed in the channel, the infill including a first component made of a first material and a second component made of a second material that is different than the first material, the second component being configured to press the first component upward against at least one of the opposing lips, the infill being operable from a flush position corresponding to the first component substantially filling the longitudinal opening to a compressed position corresponding to the first component being pressed toward the floor portion of the channel to allow for a retention device of a cargo-specific rack accessory to clamp the first and second opposing lips.

2. The vehicle rack crossbar system of claim 1, wherein an upper surface of the first component is substantially flush with an upper surface of the crossbar in the flush position.

3. The vehicle rack crossbar system of claim 1, wherein the first material includes a polymer, and the second material includes a metal.

4. The vehicle rack crossbar system of claim 3, wherein the second component includes a spring.

5. The vehicle rack crossbar system of claim 3, wherein the second component includes first and second opposing leaf springs.

6. The vehicle rack crossbar system of claim 5, wherein an upper portion of the first opposing leaf spring is connected to the first component closer to the first opposing side wall than the second opposing side wall, and the an upper portion of the second opposing leaf spring is connected to the first component closer to the second opposing side wall than the first opposing side wall.

7. The vehicle rack crossbar system of claim 6, wherein a lower portion of the first opposing leaf spring presses against the floor portion closer to the second opposing side wall than the first opposing side wall, and a lower portion of the second opposing leaf spring presses against the floor portion closer to the first opposing side wall than the second opposing side wall.

8. A vehicle rack crossbar system comprising:
a crossbar having a longitudinal opening to a cavity having first and second opposing side walls connected to a floor portion, the opening having a width and a height defined between first and second opposing lips the floor portion being connected to the first and second opposing lips by the first and second opposing side walls; and
an infill disposed in the cavity, the infill contacting the floor portion and the first and second opposing side walls, the infill including a plug portion dimensioned to correspond to the width and height of the opening, the infill being operable from a flush position corresponding to the plug portion substantially filling the longitudinal opening, to a compressed position corresponding to the plug portion moving away from the longitudinal opening and toward the floor portion to allow a retention device of a cargo-specific rack accessory to clamp the first and second opposing lips, wherein a base of the infill is seated on the floor portion, and the plug portion is cantilevered over the base.

9. The vehicle rack crossbar system of claim 8, wherein the infill has a horizontally asymmetric cross-section.

10. The vehicle rack crossbar system of claim 8, wherein the infill has a horizontally symmetric cross-section.

11. The vehicle rack crossbar system of claim 8, wherein a base of the infill is seated on the floor portion and connected to the plug portion by first and second side panels to form a hollow interior, the first side panel contacting the first opposing side wall and pressing upward on the first opposing lip, the second side panel contacting the second opposing side wall and pressing upward on the second opposing lip.

12. The vehicle rack crossbar system of claim 8, wherein the plug portion includes a first material, and a second component of the infill includes a second material that is different than the first material, the second component being configured to press the plug portion toward the flush position.

* * * * *